United States Patent
Langkabel et al.

(10) Patent No.: US 10,285,232 B2
(45) Date of Patent: May 7, 2019

(54) HEADLIGHT FOR A MOTOR VEHICLE

(71) Applicant: GM GLOBAL TECHNOLOGY OPERATIONS LLC, Detroit, MI (US)

(72) Inventors: Frank Langkabel, Rüsselsheim (DE); Rouven Haberkorn, Darmstadt (DE); Philipp Roeckl, Aschaffenburg (DE); Michael Bach, Wiesbaden (DE); Ralph Schneider, Riedstadt (DE); Ingolf Schneider, Rüsselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 209 days.

(21) Appl. No.: 15/052,301

(22) Filed: Feb. 24, 2016

(65) Prior Publication Data

US 2016/0243979 A1   Aug. 25, 2016

(30) Foreign Application Priority Data

Feb. 24, 2015 (DE) .................. 10 2015 002 341

(51) Int. Cl.
| | |
|---|---|
| *H05B 33/08* | (2006.01) |
| *B60Q 1/00* | (2006.01) |
| *F21S 43/14* | (2018.01) |
| *F21S 43/237* | (2018.01) |
| *F21S 43/249* | (2018.01) |
| *F21Y 113/13* | (2016.01) |
| *B60Q 1/26* | (2006.01) |
| *B60Q 1/28* | (2006.01) |
| *B60Q 1/38* | (2006.01) |
| *F21W 103/20* | (2018.01) |

(52) U.S. Cl.
CPC ....... *H05B 33/0845* (2013.01); *B60Q 1/0041* (2013.01); *F21S 43/14* (2018.01); *F21S 43/237* (2018.01); *F21S 43/249* (2018.01); *B60Q 1/2696* (2013.01); *B60Q 1/28* (2013.01); *B60Q 1/38* (2013.01); *B60Q 2400/20* (2013.01); *B60Q 2400/30* (2013.01); *F21W 2103/20* (2018.01); *F21Y 2113/13* (2016.08)

(58) Field of Classification Search
CPC .......... B60Q 2300/142; B60Q 2300/05; B60Q 1/1415; F21S 41/10; F21S 48/215; H05B 33/0845

See application file for complete search history.

(56) References Cited

U.S. PATENT DOCUMENTS

| | | | |
|---|---|---|---|
| 2005/0152141 A1* | 7/2005 | Suzuki ................ | B60Q 1/0052 362/241 |
| 2007/0139946 A1* | 6/2007 | Basile ................. | B60Q 1/2696 362/511 |
| 2011/0007518 A1 | 1/2011 | Lamberterie | |

(Continued)

*Primary Examiner* — Tung X Le
*Assistant Examiner* — Borna Alaeddini
(74) *Attorney, Agent, or Firm* — Lorenz & Kopf, LLP

(57) ABSTRACT

A headlight for a motor vehicle includes at least two light sources and a driver, which is arranged to vary the light intensities of the light sources with a phase shift to one another periodically between a minimum and a maximum and in the course of a period to set intermediate values between the maximum and the minimum. In a phase of the period, in which the first light source reaches the maximum of its light intensity, the light intensity of the second light source is situated at an intermediate value and increases.

13 Claims, 2 Drawing Sheets

(56) References Cited

U.S. PATENT DOCUMENTS

| | | | |
|---|---|---|---|
| 2013/0127340 A1 | 5/2013 | Huhn et al. | |
| 2013/0127612 A1 | 5/2013 | Stadler et al. | |
| 2014/0301099 A1* | 10/2014 | Watanabe | B60Q 1/0041 362/511 |
| 2015/0008840 A1* | 1/2015 | Reinprecht | G02B 6/001 315/210 |

* cited by examiner

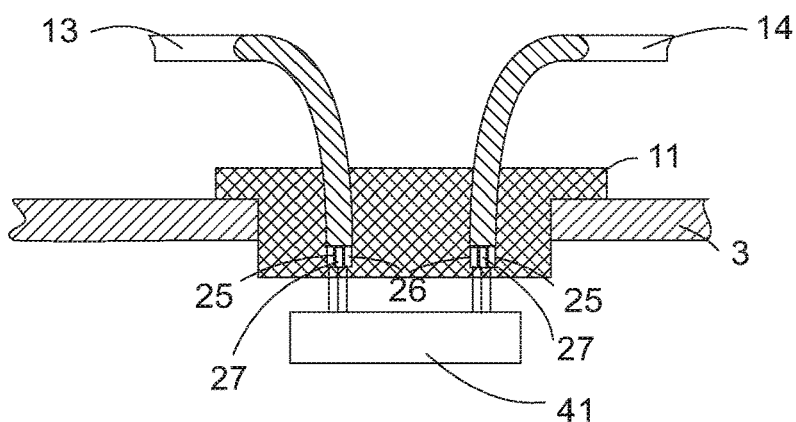
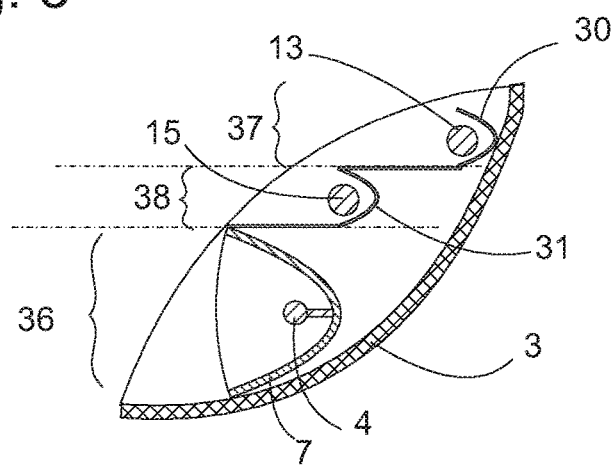
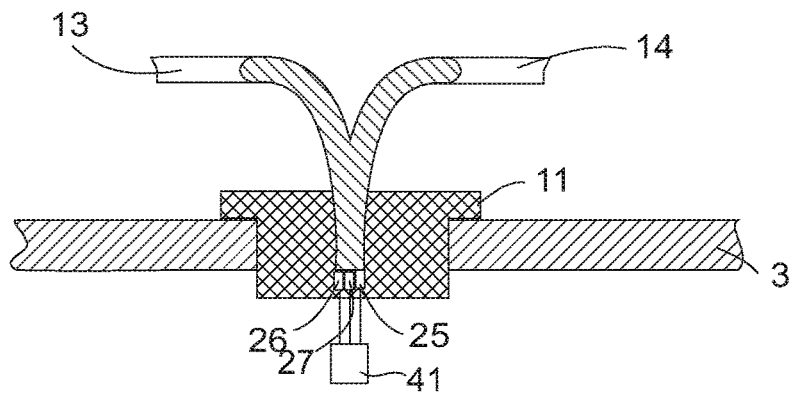

HEADLIGHT FOR A MOTOR VEHICLE

CROSS-REFERENCE TO RELATED APPLICATION

This application claims priority to German Patent Application No. 102015002341.1, filed Feb. 24, 2015, which is incorporated herein by reference in its entirety.

TECHNICAL FIELD

The present disclosure pertains to a headlight for a motor vehicle, and more particularly a blinker light or a multipurpose headlight, in which the blinker light function is combined with one or more other light functions.

BACKGROUND

In recent years, light-emitting diodes or LEDs are being used increasingly as illuminants in vehicle headlights owing to their high degree of efficiency and their small dimensions. In order to achieve the necessary light intensity for the light functions on vehicles, hitherto, often several LEDs had to be operated together in a headlight. Thereby, the possibility arose to switch the several LEDs with a small time offset in a blinker, in order to thus produce in the observer the illusion of a light source moving or spreading out in the headlight. Such so-called dynamic blinkers are enjoying increasing popularity by the public.

Further technical developments in the light-emitting diodes have led to the fact that in the meantime a small number of light-emitting diodes or even a single light-emitting diode is sufficient, in order to achieve the necessary light intensity for the lighting function of a vehicle. Frequently, the necessary light intensity can be provided with a small number of modern, high-performance light-emitting diodes even more inexpensively than with numerous low-output ones, in any case a reduction in the number of the required light-emitting diodes leads to a simpler manufacture and accordingly lower manufacturing costs and is therefore attractive for the manufacturers. However, the smaller the number of the LEDs, the more jerky the change appears, when these are switched on and off in succession, and the illusion of a moved light source can be produced all the less convincingly.

SUMMARY

The present disclosure provides a headlight for a motor vehicle, in which the illusion of a moved light source can be also be produced in a convincing manner with a small number of light sources. According to a configuration of the present disclosure a headlight for a motor vehicle includes at least two light sources. A driver is configured to vary the light intensities of the light sources with a phase shift to one another periodically between a minimum and a maximum and in the course of a period to set intermediate values between the maximum and the minimum. In one phase of the period, in which the one light source reaches the maximum of its light intensity, the light intensity of the second light source is at an intermediate value and increases. Even if only two light sources are present, the focus of the shared light distribution of the light sources, as it presents itself to the eye of an observer, can assume numerous intermediate positions and can thus bring about the illusion of a continuous movement. By the light intensity of the second light source still increasing at a moment at which the first light source has reached its maximum light intensity, the impression occurs with the observer of a single moved light source, which moves increasingly in the direction of the second light source. When the second light source is positioned nearer to an edge of the headlight than the first, this assists the impression in the observer of a movement away from the center of the vehicle, in lateral direction, corresponding to the maneuver of the vehicle announced by the blinking.

In order to ensure a sufficient conspicuousness of the light signal for other road users and a reliable detection as a blinker signal, the driver can be arranged to switch over the light intensity of both light sources simultaneously to the minimum. For the conspicuousness of the light signal, it is also expedient if the switchover to the minimum takes place at the moment at which the light intensity of the second light source has reached its maximum. The light intensity of the first light source, on the other hand, can have already decreased again to an intermediate value at the moment of the switchover.

In order to be able to implement several light functions in the headlight, it is expedient if at least one of the light sources is able to be switched over between the emission of colored, mostly yellow, light for the blinker function described above, and the emission of white light, in particular for a daytime running lamp or parking light function. Such a light source which is able to be switched over can include an illuminant producing the colored light and an illuminant producing a white light, which are operated for producing white or colored light in alternation, or an illuminant producing colored light and at least one complementary illuminant, which is able to be operated at the same time with the colored illuminant and the light of which is able to be superimposed with the colored light to the white light. The fact that the white and the colored light originates from different illuminants can be concealed from the eyes of the observer by the light source, which is able to be switched over, including a diffuser which is beamed at by the differently colored illuminants, at which diffuser the light of the different illuminants can mix and from where it can reach the eye of the observer.

The headlight can be a blinker- and position indicator lamp, which can be integrated e.g. into the housing of an exterior mirror. It can, however, also concern a front headlight; then, in addition at least a third light source should also be provided, which emits white light, in order to realize a main beam- and/or dipped beam function in one. When the headlight is a taillight, a third light source can emit red or—as a reversing signal—white light.

A shield of the headlight, viewed from the direction of a beam emitted by the third light source, can be divided into a main region, from which the beam originates, a first edge region, via which the first light source emits, and a second edge region, via which the second light source emits. In order to produce the illusion of an outwardly directed movement, the first edge region extends here expediently between the main region and the second edge region.

The diffuser preferably has an elongated shape corresponding to the shape of the edge region receiving it. In order to achieve a uniform distribution of the light intensity over the edge region, the diffuser can include a stem section, on which the illuminants are arranged, and two branches proceeding from the stem section.

BRIEF DESCRIPTION OF THE DRAWINGS

The present disclosure will hereinafter be described in conjunction with the following drawing figures, wherein like numerals denote like elements.

FIG. 2 is a section through the headlight along the section plane II-II in FIG. 1;

FIG. 3 is a section through the headlight along the section plane III-III in FIG. 1;

FIG. 4 shows a configuration of the diffuser for a second variant; and

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
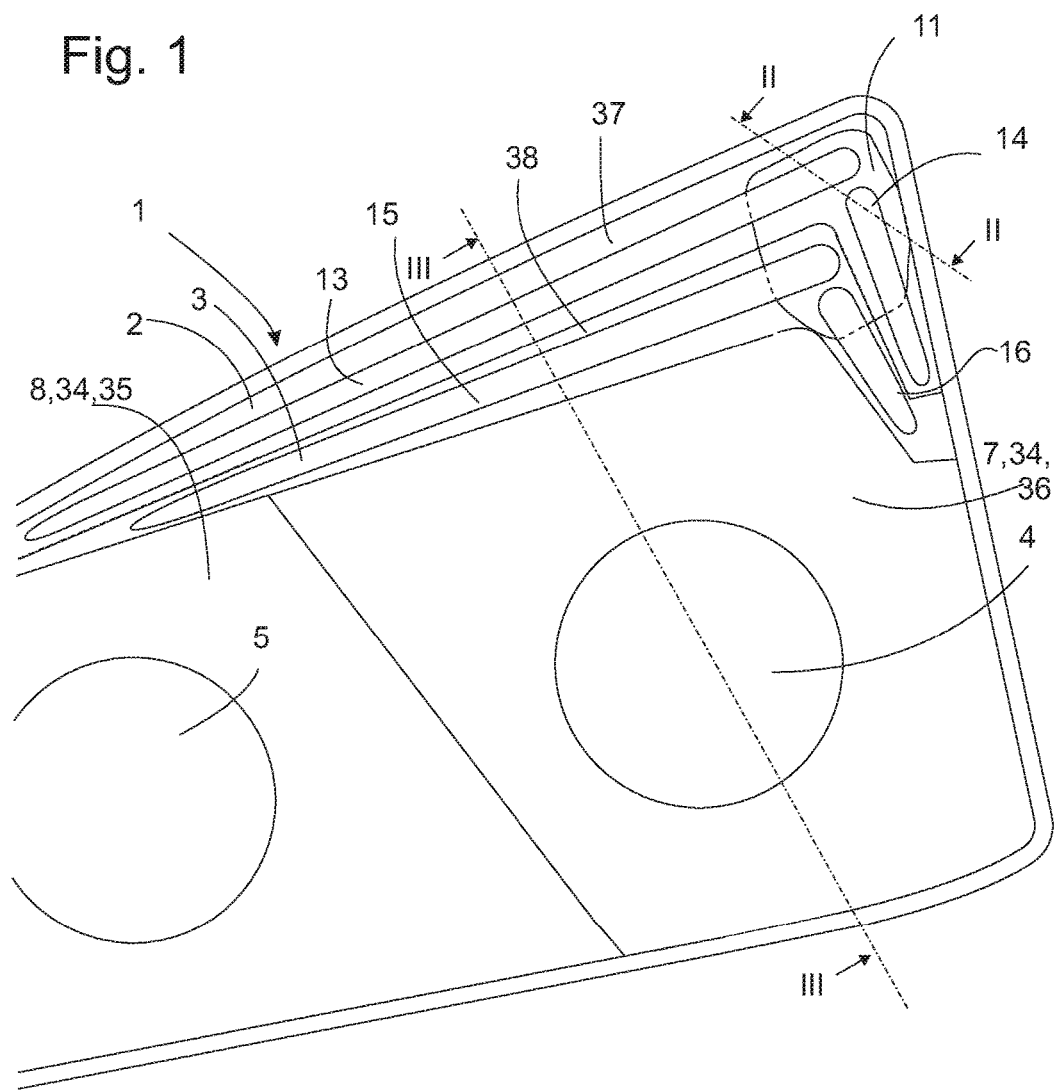
FIG. 1 is a diagrammatic view of a headlight.

FIG. 1 shows a headlight 1 for a motor vehicle in a diagrammatic view. The headlight 1 is divided according to its different light functions into regions 35, 36, 37, 38. When a from headlight is concerned, the region 35, designated as dipped beam region, can contain a light source 4 and a reflector 7, which bundles the light of the light source 4 to a dipped light beam. The region 36, designated as main beam region, contains a light source 5 and a reflector 8, which bundles the light of the light source 5 to a main light beam. The main light beam and dipped light beam are emitted in only slightly different directions and can both be considered as a principal beam of the headlight 1, which spreads out opposed to the viewing direction onto the headlight 1 in FIG. 1. Accordingly, the two regions 35, 36 can be considered together as a main region 34 of the headlight 1. In the case of a taillight, the region 35 could emit red light, whilst the region 37 functions as a reversing signal and emits white light.

The region 37, designated as outer edge region, is hook-shaped with an upper leg running along an upper edge of the headlight, and with a lateral leg, which runs along the upper part of a lateral edge of the headlight adjoining a mudguard of the vehicle. The outer edge region 37 contains two elongated diffusers 13, 14, one of which extends in the upper leg and the other in the lateral leg, and a reflector 30 filling the entire outer edge region 37. The inner edge region 38 enclosed between the first edge region 37 and the main region 34 is hook-shaped and contains in each of its two legs an elongated diffuser 15 or respectively 16 and a reflector 31 extending behind the diffusers 15, 16.

FIG. 2 shows a section along the section plane II-II in FIG. 1. Ends of the diffusers 13, 14 are inserted in recesses of a socket 11. At the bottom of each recess, three illuminants 25, 26, 27 are arranged so that they radiate through the diffuser 13 or respectively 14 from its inserted end. The diffusers 13, 14 emit the irradiated light continuously over their length. The diffusers 15, 16 are inserted in the same manner as the diffusers 13, 14 into recesses of the socket 11 equipped with the illuminants 25, 26, 27. An electronic driver 41 controls the illuminants 25, 26, 27 of the light sources 2, 3.

Alternatively, two identically constructed sockets could also be mounted in the headlight 1, one of which receives the diffusers 13, 14 of the outer edge region 37 and the other of which receives the diffusers 15, 16 of the inner edge region 38. The diffusers 13, 14 of the outer edge region 37 form together with the illuminants 25, 26, 27 radiating through them a light source 2; a further light source 3 of the inner edge region 38 includes the diffusers 15, 16 and the illuminants 25, 26, 27 thereof.

The diffusers 13, 14, 15, 16 shown in FIG. 1 taper proceeding from the end which is received in the socket 11, towards the other, free end. As the diffusers 13, 14, 15, 16 emit light along their length, the light flux in the diffusers decreases respectively from the socketed end towards the free end. In the case of a diffuser with a constant cross-section, this would result in a decreasing light density towards the free end. As a result of the tapering, also the light-emitting area of the diffusers becomes narrower towards the free end, the decrease of the light density can be reduced or the light density can even be kept constant.

FIG. 3 shows a section through the headlight along the section plane III-III in FIG. 1. The dipped beam region 35 and the edge regions 37, 38 are staggered in longitudinal direction of the vehicle; by the second edge region 38 being set back behind the dipped beam region 36 lying therebeneath, and the first edge region 37 being set back behind the second edge region 38 lying therebeneath, a streamlined, swept shape of the headlight 1 is obtained. In the configuration of FIG. 3, the diffusers 13, 15 have respectively a round cross-section, and the reflectors 30, 31 are arranged spaced apart from the diffusers 13, 15. As reflectors 30, 31 directly adjoin one another, the edge regions 37, 38, when the illuminants 25, 26, 27 are simultaneously in operation in both, form a single cohesive luminous area for the eyes of an observer.

According to a first variant, the reflectors 30, 31 can be replaced by a reflecting layer which is applied directly onto a surface of the diffusers 13, 14, 15, 16 facing the interior of the headlight 1. So that also in this case a single cohesive luminous area is presented to the eyes of an observer, although the diffusers 13, 14 and 15, 16 of the two edge regions 37, 38 are separated by a gap, a glass body, which fours the outer side of the headlight, can be provided in front of the edge regions 37, 38 with suitable refractive elements.

FIG. 4 shows the two diffusers 13, 14 for a second variant in a section along a section plane analogous to FIG. 2. The ends of the two diffusers 13, 14 facing the illuminants are fused here to one another and are received in a shared recess of the socket 11. The illuminants 25, 26, 27 arranged in this recess supply both diffusers 13, 14. In this way, illuminants can be saved compared with the embodiment in FIG. 2. The diffusers 15, 16 can also be embodied according to this second variant.

According to a first configuration, at each diffuser 13, 14, 15, 16 the illuminant 25 is a red LED, the illuminant 26 a green LED and the illuminant 27 a blue LED, the light of which mixes in the respective diffuser. The color of the LEDs is selected so that their light superimposes to white light with full light intensity.

To operate the edge region 38 as a daytime running lamp, the driver 41 switches on the LEDs 25, 26, 27 at the diffusers 15, 16, so that the light source 3 of the edge region 38 emits white light. The light source 2 remains switched off. In order to produce a parking light with lower light intensity as the daytime running lamp, the driver 41 can jointly dim the LEDs 25, 26, 27 of the light source 3. Alternatively, the daytime running lamp can be produced by the driver 41 operating the LEDs 25, 26, 27 of both light sources 2, 3 simultaneously with full light intensity and by operating the LEDs 25, 26, 27 of only one of the light sources 2, 3 for the production of a parking light.

Figure 5:
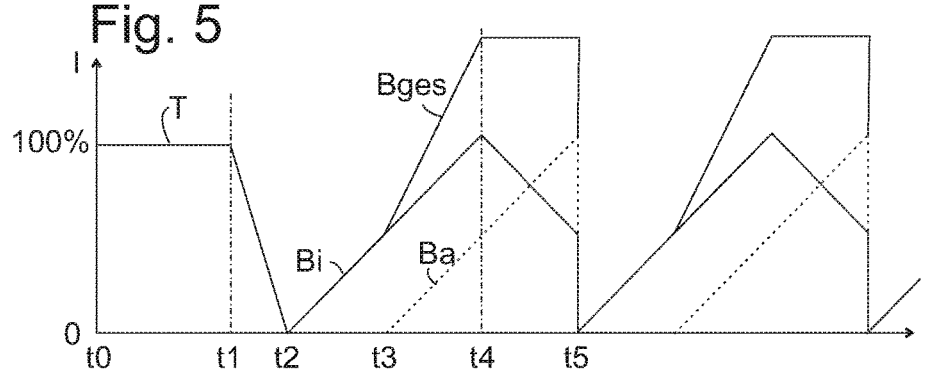
FIG. 5 is a graph representing the light intensity of different light sources of the headlight in the course of time.

The operation of the headlight as a blinker is explained with the aid of FIG. 5. FIG. 5 shows the light intensity I of the red LEDs 25 of the two light sources 2, 3 as a function of time t. At a moment t0 the headlight is in operation as a daytime running lamp, and the LEDs 25, 26, 27 of both light sources 2, 3 run with their full light intensity (100%), according to a curve T in FIG. 5, up until at moment t1 the vehicle driver sets the blinker. Thereupon, the LEDs 25, 26, 27 are firstly all switched off or, as illustrated in FIG. 5, their light intensity is shut down to 0 in a short time span up to t2. At the moment t2 the first period of the blinker signal begins, by the light intensity of the red LED 25 of the light source 3 gradually being raised again, as illustrated by a curve Bi with long dashes. In order to obtain yellow light, the green LED 26 is raised again in the same manner, whereas the blue LED 27 remains switched off or, in order to precisely adjust a desired shade of color of the yellow blinker light, is operated with a light intensity which is proportional to the light intensity of the LEDs 25, 26 but is substantially less. The driver can regulate the light intensity of the LEDs continuously in accordance with the illustration of FIG. 5, or it can increase it in a plurality of discrete steps from 0 to 100%.

When at the moment t3 the light intensity of the LED 25 of the light source 3 has reached a predetermined threshold value of e.g. 50% of its maximum light intensity, the driver 41 also begins to increase the light intensity again in the LED 25 of the light source 2, illustrated by a curve Ba in short dashed lines. Up to the moment t4, at which the LED 25 of the light source 3 reaches its maximum light intensity, the light intensities of both light sources 2, 3 jointly increase, wherein the impression of the observer of a moving light source in this time is based on the increasing relative portion of the light source 2 in the overall brightness of the blinker—illustrated by a curve Bges.

Starting from the moment t4, the driver 41 regulates the light intensity of the LEDs of the light source 3 down again, which intensifies the illusion of a movement of the light source. In order to generate a typical, chronologically sharply delimited light impulse for a vehicle blinker, the driver does not return the light intensity of the LEDs 25 continuously back to 0, but rather switches it off abruptly at a moment t5 in both light sources 2, 3. In the case considered here, this moment t5 is also the one at which the LED 25 of the light source 2 reaches its maximum light intensity.

At the moment t5, as shown, a second period of the blinker signal can begin immediately; however, a waiting time could also be provided, in which the LEDs of both light sources 2, 3 remain switched off, before the light intensity of the LED 25 of the light source 3 increases again.

According to a second configuration, the socket 11 is not equipped with three LEDs in the primary colors, but rather each light source 2, 3 has respectively a white LED 27 for daytime running lamp and parking light and a yellow LED 25 for the blinker, and the installation space for the LED 26 shown in FIG. 2 or 4 is missing or remains free. The sequence shown in FIG. 5 does not change substantially thereby; the curve T shows the light intensity of the white LED 27; this remains switched off, as long as the blinker operation continues. The curve Bi shows the light intensity of the yellow LED 25 of the light source 3, and the curve Ba shows that of the yellow LED 25 of the light source 2 situated closer to the edge of the headlight 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A headlight for a motor vehicle comprising:
   a first light source having a first light intensity;
   a second light source having a second light intensity; and
   a driver configured to vary the first and second light intensities with a phase shift to one another periodically between a minimum value and a maximum value, and in the course of a period to set intermediate values between the maximum value and the minimum value, wherein in a phase of the period in which the first light intensity reaches the maximum value, the second light intensity is set at an intermediate value increasing to the maximum value, and
   wherein the driver is programmable to:
   deactivate, at a first moment upon receipt of a blinker signal, the first light source and the second light source;
   activate, at a second moment, the first light source such that the first light intensity increases from the minimum value to a first value of the intermediate values while maintaining the deactivation of the second light source;
   activate, at a third moment when the first light intensity reaches the first value, the second light source such that the second light intensity increases from the minimum value to a second value of the intermediate values while maintaining the activation of the first light source such that the first light intensity increases from the first value to the maximum value;
   deactivating, at a fourth moment when the first light intensity reaches the maximum value, the first light source such that the first intensity decreases from the maximum value while maintaining the activation of the second light source such that the second light intensity increases from the second value to the maximum value; and
   deactivating, at a fifth moment when the second light intensity reaches the maximum value, the first light source and the second light source such that the first light intensity and the second light intensity decrease to the minimum value.

2. The headlight according to claim 1, wherein the second light source is positioned closer to an edge of the headlight than the first light source is to the edge.

3. The headlight according to claim 1, wherein at least one of the first and second light sources is configured to be switched over between the emission of colored light and the emission of white light.

4. The headlight according to claim 3, wherein at least one of the first and second light sources comprises an illuminant producing colored light and producing white light.

5. The headlight according to claim 3, wherein at least one of the first and second light sources comprises an illuminant producing at least one colored light and at least one complementary illuminant, the light of which is able to be superimposed with the colored light to produce white light.

6. The headlight according to claim 5, wherein at least one of the first and second light sources comprises a diffuser which is beamed at by at least one of the illuminant and the complementary illuminant.

7. The headlight according to claim 1, further comprising a third light source emitting white light or red light.

8. The headlight according to claim 7 which, viewed from a front direction of a beam emitted from the third light source, comprises a main region, via which the third light source emits third light, a first edge region, via which the first light source emits first light, and a second edge region, via which the second light source emits second light.

9. The headlight according to claim 8, wherein the first edge region extends between the main region and the second edge region.

10. The headlight according to claim 9, wherein at least one of the first and second light sources comprises a diffuser extending along one of the first and second edge regions.

11. A headlight for a motor vehicle, comprising:
- a main light source configured to generate a main light beam;
- a main reflector forming at least a portion of a main region with the main light source and directing the main light beam from the main light source out of the headlight, the main reflector having a perimeter formed by an outer edge region;
- a first diffuser adjacent to the main reflector and extending along at least a portion of the outer edge region;
- a first edge light source optically coupled to the first edge diffuser, the first light source having a first light intensity that selectively varies between a minimum value, a maximum value, and intermediate values between the minimum value and the maximum value;
- a second diffuser adjacent to the first diffuser on a side opposite the main reflector;
- a second edge light source optically coupled to the second edge diffuser, the second edge light source having a second light intensity that selectively varies between the minimum value, the maximum value, and intermediate values between the minimum value and the maximum value; and
- a driver electrically coupled to the first edge light source and the second edge light source, the driver programmable to:
  - deactivate, at a first moment upon receipt of a blinker signal, the first edge light source and the second edge light source;
  - activate, at a second moment, the first edge light source such that the first light intensity increases from the minimum value to a first value of the intermediate values while maintaining the deactivation of the second edge light source;
  - activate, at a third moment when the first light intensity reaches the first value, the second edge light source such that the second light intensity increases from the minimum value to a second value of the intermediate values while maintaining the activation of the first light source such that the first light intensity increases from the first value to the maximum value;
  - deactivating, at a fourth moment when the first light intensity reaches the maximum value, the first edge light source such that the first intensity decreases from the maximum value while maintaining the activation of the second edge light source such that the second light intensity increases from the second value to the maximum value; and
  - deactivating, at a fifth moment when the second light intensity reaches the maximum value, the first edge light source and the second edge light source such that the first light intensity and the second light intensity decrease to the minimum value.

12. The headlight of claim 11, wherein the driver is configured such that the first value and the second value are the same.

13. The headlight of claim 12, wherein the driver is configured such that the first moment, the second moment, the third moment, the fourth moment, and the fifth moment form a time period, and wherein the driver is configured such that the time period is repeated until the blinker signal is deactivated.

* * * * *